United States Patent [19]

Minaguchi

[11] 4,199,148
[45] Apr. 22, 1980

[54] AUTOMATIC RECORD PLAYER

[75] Inventor: Shinichi Minaguchi, Ehime, Japan

[73] Assignee: Matsushita Electric Industrial Co., Ltd., Osaka, Japan

[21] Appl. No.: 899,215

[22] Filed: Apr. 24, 1978

[30] Foreign Application Priority Data

Apr. 26, 1977 [JP] Japan .................................. 52-48890

[51] Int. Cl.² ............................................. G11B 17/00
[52] U.S. Cl. ................................................ 274/15 R
[58] Field of Search ................................ 274/10 R, 15

[56] References Cited

U.S. PATENT DOCUMENTS

| | | | |
|---|---|---|---|
| 2,424,132 | 7/1947 | Alexandersson | 274/15 R X |
| 2,481,270 | 9/1949 | Wennerbo | 274/10 R |
| 2,536,453 | 1/1951 | Leline | 274/10 R |
| 2,545,643 | 3/1951 | Bender | 274/10 R |
| 2,591,515 | 4/1952 | Dale | 274/15 R X |

*Primary Examiner*—Charles E. Phillips
*Attorney, Agent, or Firm*—Stevens, Davis, Miller & Mosher

[57] ABSTRACT

An automatic record player having an improved mechanism for automatically swinging the pickup arm to and from the playing position. The mechanism comprises a large gear having a non-toothed portion engageable with a small gear adapted to be driven by a motor, starting means adapted to bring the large gear into engagement with the small gear, and a movable plate adapted to be moved together with the pickup arm along a path of travel which runs above the large gear. To the large gear is pivotally attached a member for swinging the pickup arm, under control of a disc-size switching means, from a resting position to the playing position in association with the rotation of the large gear. The large gear may be provided with a cam portion for bringing the pickup arm from the playing position back to the resting position in association with the rotation of the large gear. Consequently, the swinging motion of the pickup arm is controlled substantially directly by the large gear without necessitating the aid of other intermediate members, thereby ensuring an enhanced reliability and a lowered cost of production of the record player.

5 Claims, 4 Drawing Figures

AUTOMATIC RECORD PLAYER

BACKGROUND OF THE INVENTION

The present invention relates to an automatic record player adapted to automatically swing a pickup arm to and from the playing position at a start and a stop of the performance.

Automatic record players making use of the torque of the turn table as a power source for automatic operation of the pickup arm have been well known. In these known record players, a large gear having a non-toothed portion is adapted to engage a small gear or pinion formed on the rotary shaft of the turn table.

The arrangement is such that the engaged pinion drives the large gear which in turn reciprocally moves a driving plate so as to swing the pickup arm. In addition, the setting of the performance start position is made by means of an index mechanism which is arranged independently of the pickup arm swinging mechanism including the large gear and the driving plate.

Thus, the known automatic record player of the kind described above inconveniently requires a number of intermediate power transmission members such as the driving plate for converting the rotary motion of the large gear into the reciprocatory swinging motion of the pickup arm.

Thus, the transmission mechanism is undesirably complicated, requiring compensation for the deterioration of each part for obtaining the desired transmission and an unpractically high degree of precision assembling. Consequently, the designated reliability of the operation can be achieved only through an assembly which results in an increased cost of production of the record player.

SUMMARY OF THE INVENTION

It is therefore an object of the invention to provide an automatic record player in which the number of members for transmitting the power to swing the pickup arm is considerably reduced so as to simplify the structure of the record player, while enhancing the reliability of its operation.

To this end, according to the invention, there is provided an automatic record player comprising a large gear having a non-toothed portion and being engageable with a small gear or pinion adapted to be driven by an electric motor, starting means for bringing the large gear into engagement with the small gear to cause a rotation of the large gear and a movable plate moved in association with the movement of the pickup, the large gear being positioned over the locus of movement of a projection formed on the movable plate, the large gear having a cam section adapted to swing the pickup at least from a playing position to a resting position upon engagement with the projection.

The above and other objects, as well as advantageous features of the invention will become more clear from the following description of the preferred embodiment taken in conjunction with the accompanying drawings.

DESCRIPTION OF THE PREFERRED EMBODIMENT

Figure 1:
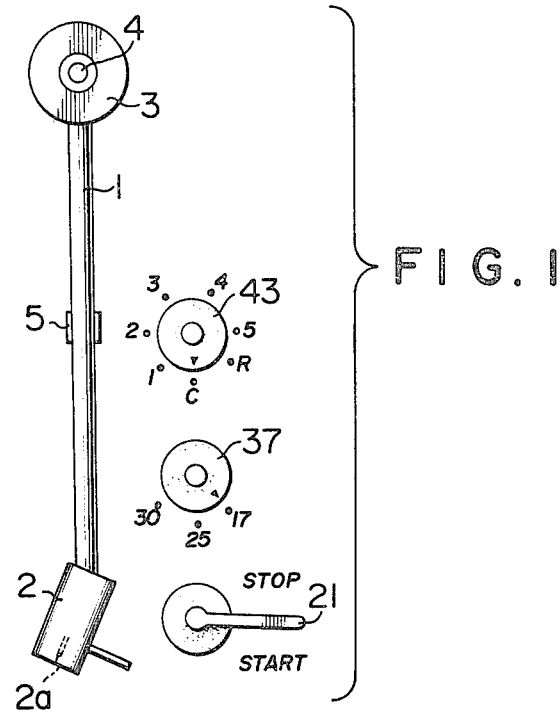
FIG. 1 is a plan view of an arrangement for operating or manipulating the record player of the invention.
Figure 2:
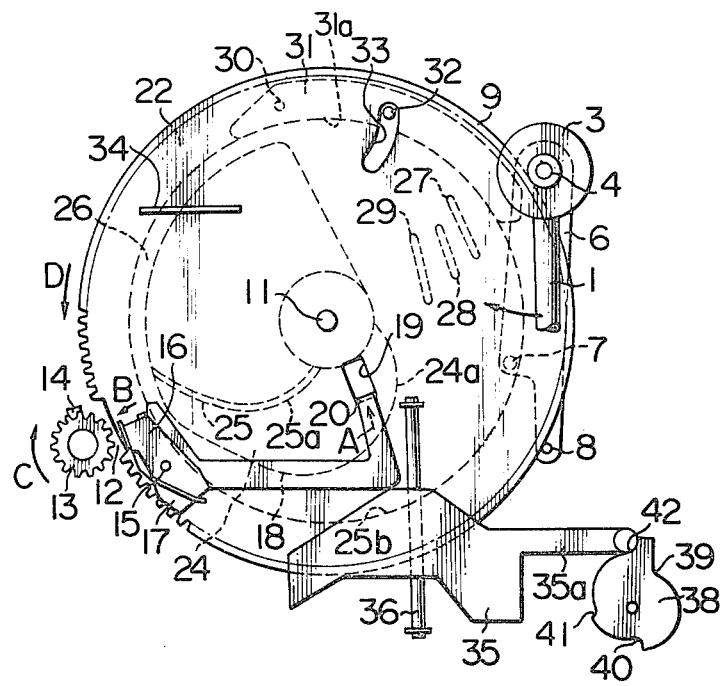
FIG. 2 is a top plan view of the construction for the arrangement as shown in FIG. 1.
Figure 3:
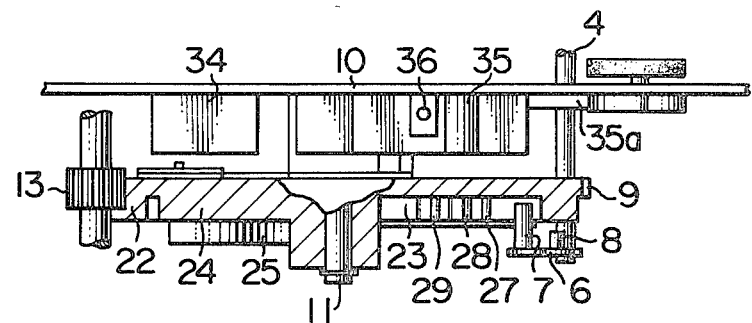
FIG. 3 is a side elevational view of the construction as shown in FIG. 2.
Figure 4:
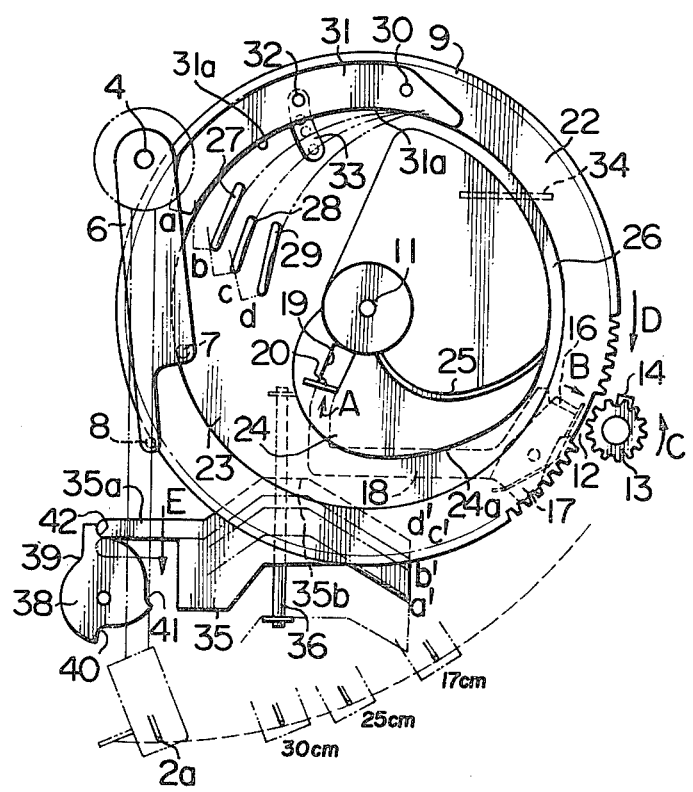
FIG. 4 is a bottom plan view of the construction as shown in FIG. 1.

Referring to the drawings shown in a preferred embodiment of the invention, a pickup head 2 including a head shell and a cartridge is secured to one end of a pickup arm 1 of a record player. The pickup arm 1 is supported at the other end thereof by means of an arm support 3 which is mounted for free rotation around the shaft 4. These members as a whole will be hereinafter referred to as "pickup". Although not shown, this pickup includes a mechanism for causing rotation of the arm support in the vertical plane, a balance weight and so forth. In the drawings, reference numeral 2a denotes a stylus for reproduction, while 5 denotes an arm rest on which the pickup arm 1 is adapted to rest. A pick-fixing plate 6 is carried at its one end by the rotary shaft 4 of the pickup and carries at its other end two vertical shafts or pins 7, 8. The lengths of these pins are so selected that the pin 7 is taller than the other 8. The arrangement is such that the fixing plate 6 is pivotally swung as the pickup arm 1 is swung around the rotary shaft 4.

A larger gear 9 is rotatably mounted onto a shaft 11 which is secured to the lower side of a stationary base plate 10, and is so located as to cover the locus of movement of the pins 7, 8. The large gear 9 is provided with gear teeth over its entire periphery excepting a non-toothed portion 12. A small gear 13 having a unitary pawl 14 is located to confront the non-toothed portion 12 of the large gear 9. The small gear 13 may be directly attached to the rotor shaft of a driving motor if the record player incorporates a direct-driving motor, or may be secured to the rotary shaft of the turn table if the record player is of an ordinary type in which the turn table is indirectly driven by the motor. Needless to say, the small gear 13 may be attached to the rotor shaft of a separately provided motor.

A starting link 16 and a friction link 17 are pivotally supported by a link shaft 15, and are located in the close proximity of the non-toothed portion 12 of the large gear 9. The starting link 16 has an arm section 18 unitary therewith. The free end portion of the arm section 18 is a bend 20 which extends through an aperture 19 formed in the large gear 9.

The bend 20 is adapted to be moved in the direction of an arrow A, through a starting rod (not shown) rotatably supported by a guide section (not shown) by a swinging of a start lever 21 in either the starting or stopping direction, thereby rotating the starting link 16 and the friction link 17 around the shaft 15 in the direction of an arrow B. Consequently, the friction link 17 comes to contact at its end with the pawl 14 of the small gear 13 which is rotating in the direction of an arrow C, thereby bringing the large gear 9 into engagement with the small gear 13 to cause the large gear 9 to rotate in the direction of an arrow D.

The bend 20 is located in a position corresponding to one end of the locus of movement of the pin 8 on the pick fixing plate 6. Therefore, the pin 8 pushes the bend 20 in the direction of the arrow A, as the stylus 2a of the cartridge is drawn into the final groove formed at a radially inner side of the record disc upon completion of the performance, thereby bringing the large gear 9 into engagement with the small gear 13 in the manner described above.

Concerning the profile of the large gear 9, the large gear 9 has a ring-shaped outer peripheral wall 22 and a recess 23 defined by the radially-inner side of the peripheral wall 22. On the bottom surface of the recess 23, a first cam 24 is formed which in turn carries a second cam 25 formed unitarily therewith. The first cam 24 has an arcuate cam contour or a cam surface 24a for swinging the pickup from the final position of performance to the resting position on the arm rest 5, while the second cam 25 has an auxiliary cam surface 25a for slightly biasing the pickup which has been moved to the final position of performance, toward the resting position, thereby to assist the cam surface 24a in swinging the pickup back to the resting position. A cam groove 26 for retaining the pickup at the resting position is formed between the first cam 24 and the outer peripheral wall 22 of the large gear 9. A plurality of index ribs 27, 28, 29 are formed on the bottom surface of the recess 23. These index ribs 27, 28 and 29 are located as to guide the stylus of the pickup to the lead-in grooves of 30 cm (12 inches), 25 cm (10 inches) and 17 cm (7 inches) dia. size discs, respectively.

A starting cam plate 31 having an arcuate shape is pivotally attached to the outer peripheral wall 22 of the large gear 9 through a shaft 30. The cam plate 31 is adapted to perform a click motion by a click means which may be of such a known type as having a ball and a cooperating recess and is, therefore, neglected from the drawings.

The click means allows the cam plate 31 to positively assume four positions: a position (b) at which the free end of the cam plate 31 overlies the rib 27, a position (c) at which the same end overlies the rib 28 a position (d) at which the end overlies the rib 29 and a position (a) at which the end overlies the outer peripheral wall 22. The cam plate 31 has a cam contour or cam surface 31a which is so shaped as to be flush with the inner peripheral surface of the outer peripheral wall 22. A post 32 is fixedly provided on the cam plate 31 so as to extend through an aperture 33 of the large gear 9. The stationary base plate 10 is bent at a portion thereof to form a reset plate 34 to return the cam plate 31 to the position (a) where the latter overlies the outer peripheral wall 22, upon engagement with the post 32 as the large gear 9 rotates.

A disc-size setting member 35 is provided for bringing the cam plate 31 to the positions (b), (c) and (d) where the latter respectively overlies the ribs 27, 28 and 29. The disc-size setting member 35 is adapted to be slightly moved in the direction of an arrow E along a guide rod 36 fixed to the stationary base plate 10, and is biased in the direction of the arrow E by a spring which is not shown. The arm section 35a of the disc-size setting member 35 is adapted to contact the outer peripheral cam surface of a disc-size select cam plate 38 which is fixed to a disc-size select dial 37 (See FIG. 1) for a unitary rotation therewith. Four recesses 39-42 are formed on the above mentioned outer peripheral cam surface, which recesses are adapted, to set the disc-size setting member 35 at positions corresponding to respective disc sizes. When the end of the arm section 35a of the disc-size setting member 35 is caught by the recess 39, the post 32 of the cam plate 31 is kept away from the cam surface 35b of the disc-size setting member 35, during the rotation of the large gear 9. However, as the dial 37 is rotated to bring anyone of the recesses 40-42 into engagement with the end of the arm section 35a, the post 32 is engaged with the cam surface 35b so that the cam plate 31 is moved to overlie the corresponding index rib 27, 28, or 29.

The vertical position of the pick-fixing plate 6 carrying the pins 7, 8 is selected as to allow the pin 8 to contact only the second cam 25 of the large gear 9, while the pin 7 is received by the recess 23 of the large gear 9 but kept out of contact with the bottom surface of the recess. Consequently, the pin 7 is so positioned as to contact with all of the cam surface 24 of the first cam 24, the cam groove 26 and the cam surface 31a of the cam plate 31.

Although not shown in the drawings, the record player of this embodiment is equipped with a repeat mechanism including a repeat dial 43 (See FIG. 1), for automatically repeating the performance. The arrangement is such that the aforementioned disc-size select switch 37 is automatically rotated to a non-select position as the dial 43 of the repeat mechanism is set at a zero position. This causes the disc-size select cam plate 38 to take a non-select position so that the disc-size setting member 35 is returned by the force of the spring to the inactive position for the cam plate 31.

A cueing mechanism (not shown) for causing a vertical swinging motion of the pickup arm 1 is adapted to be driven by the large gear 9 in such a manner as to effect an upward movement of the pickup arm at an early period of rotation of the large gear, and a downward movement of the same in a later part of the rotation of the same. This operation can be achieved by, for example, making the top surface of the outer peripheral wall 22 of the large gear constitute a cam surface engageable with a support shaft of a movable plate which in turn is contacted by the pickup arm 1.

In operation, as the disc-size select dial 37 is rotated to select the desired size (17 cm (7 inches), for example), the end of the arm section 35a of the disc-size setting member 35 comes to be received by the recess 42 of the disc-size select cam plate 38. Then, after setting the repeat mechanism for a desired number of repetitions, the motor (not shown) is started by turning the start lever 21 to the starting side so that the small gear 13 starts to rotate. Simultaneously, as stated before, the bend 20 of the arm of the friction link 17 is pushed so as to bring the starting link 16 into engagement with the pawl 14 of the small gear 13, thereby the large gear 9 is rotated slightly to come into engagement with the small gear 13. Consequently, the large gear 9 starts to rotate, being driven by the small gear 13. At the initial or early stage of the rotation of the large gear 9, the pickup arm 1 is moved upward, and, simultaneously, the post 32 of the cam plate 31 engages the reset plate 34 so as to be reset to overlie the outer peripheral wall 22 of the large gear 9.

A further rotation of the large gear 9 brings the post 32 of the cam plate 31 into engagement with the cam surface 35b of the disc-size setting member 35 so that the cam plate 31 is moved to the position where it overlies the rib 29. Then, the pin 7 of the pick-fixing plate is moved along the cam surface 31a of the cam plate 31 to the position of the rib 29. Consequently, the pickup arm 1 is swung to the play starting position of a record disc, i.e. to the position where the stylus 2a is positioned just above the lead-in groove of the 17 cm dia. size disc.

The pickup arm 1 is then lowered in the later part of the rotation of the large gear 9 so as to place the stylus on the record disc to start the performance. After making a full turn, the large gear 9 has the non-toothed portion opposed to the small gear 13. Consequently, the large gear 9 is disengaged from the small gear 13 to stop its rotation.

As the performance is completed, that is: the stylus 2a is received by the finishing groove formed in the radially inner portion of the disc, the pin 8 of the pick-fixing plate 6 hits the bend 20 of the friction link 17 so that the rotation of the large gear 9 is commenced again in the same manner as before.

Thus, the pickup arm 1 is moved upward at the initial stage of the rotation of the large gear 9 so as to make the stylus 2a clear the record disc. Simultaneously, the pin 8 of the pick-fixing plate 6 is abutted to and moved by the cam surface 25a of the second cam 25 so as to slightly displace the pickup arm 1 toward the resting position, i.e. toward the arm rest 5. Subsequently, the pin 8 of the pick-fixing plate 6 comes into contact with the cam surface 24a of the first cam 24, and is displaced by the latter into the cam groove 26 so that the pickup arm is fully swung to the position just above the arm rest 5.

Whenever the repeat dial has been set at the zero position, as previously mentioned the disc-size setting member 35 is automatically returned to the position (a') where it does not act on the cam plate 31, and therefore, the arm 1 is lowered to rest on the arm rest 5 in the latter part of the rotation of the large gear 9, then the motor is turned off.

On the contrary, if the repeat dial has been set at position other than zero position, the cam plate 31 is moved again by the disc-size setting member 35 to the position (d) corresponding to play start position for the 17 cm dia. size disc so as to bring again the pickup arm 1 to the play start position for the same disc, thereby to restart the performance. For information, the aforementioned repeat dial is so arranged as to be rotated by one scale unit by the torque of the large gear 9 in the later part of the rotation of the same for each completion of the performance.

When it is required to stop the performance at an intermediate portion of the record disc, the start lever 21 is turned to the stopping side. At this time, the repeat dial is turned immediately to the zero position so that the disc-size setting member 35 is moved back to the position where it does not act on the cam plate 31. Consequently, the rotation of the large gear 9 is triggered to lift and swing the pickup arm 1 back to the rest position on the arm rest 5.

As has been described in the automatic record player of the invention, the pickup arm is swung to and from the playing position substantially directly by the large gear, without necessitating the aid of intermediate power transmitting members. Therefore, the construction of the record player is much simplified, thereby resulting in a lowered cost of production. Also, an enhanced reliability of the operation is achieved, and the troublesome accurate compensation is completely eliminated, due to the reduced number of intermediate linkage parts.

Having described the invention through its preferred form, it is to be noted here that various changes and modifications are possible without departing from the spirit and scope of the invention which are claimed solely by the appended claims.

What is claimed is:
1. An automatic record player comprising:
(a) a stationary base plate;
(b) a pickup arm carrying at a free end a stylus for detecting signals on a record disc;
(c) a shaft fixed to the other end of said pickup arm, and rotatably held by said stationary base plate so that said pickup arm is swingable;
(d) a small gear arranged to be rotated by an electric motor;
(e) a large gear engageable with said small gear, said large gear having a non-toothed portion in which said small gear is normally positioned;
(f) means for starting the engagement between said large gear and said small gear whereby said large gear makes one complete turn at the start and stop of a record performance of said automatic record player;
(g) a pick-fixing plate carried by said shaft so as to swing simultaneously with said pickup arm;
(h) a pin mounted to said pick fixing plate;
(i) a cam plate swingable mounted in the peripheral portion of said large gear having a cam surface arranged to cooperate with said pin, said cam plate having a plurality of positions where said cam surface extends inwardly from the peripheral portion of said large gear;
(j) a post mounted to said cam plate;
(k) means, carried by said large gear, for guiding said pin during a complete turn of said large gear so as to swing said pickup arm to and from the playing position at the start and stop of a record disc performance of said automatic record player, said means comprising a first cam, a second cam unitarily mounted on said first cam, said first cam cooperating with said pin so as to swing said pickup arm from the final position of performance to the rest position, said second cam being arranged to slightly bias said pickup arm when said pickup arm is at the substantially final position of the performance toward the resting position so as to assist said first cam in swinging said pickup arm toward the rest position;
(l) a reset plate carried by said stationary base plate, and arranged to abut said post so as to reset said cam plate to a most retracted position in the peripheral portion of said large gear; and
(m) a disc size setting member arranged to cooperate with said post for setting said cam plate so that said cam surface guides said pin in accordance with the size of the record disc, whereby said pickup arm brings said stylus to the lead-in groove of the record disc upon the start of a record performance.

2. An automatic record player as set forth in claim 1, wherein said starting means comprises a friction link and a starting link which are swingably carried by said large gear, said friction link being engaged by said pick fixing plate when said stylus is drawn into the final groove of the record disc, so as to frictionally actuate said starting link which in turn initiates engagement between said large gear and said small gear.

3. An automatic record player as set forth in claim 1, said guiding means further comprising a plurality of ribs formed on said large gear, to which ribs said cam surface of said cam plate respectively overlies by means of said disc-size setting member in accordance with the size of the record disc.

4. An automatic record player as set forth in claim 1, wherein said disc size setting member is slidably mounted to said stationary base plate so as to successively protrude inwardly from the peripheral portion of said large gear.

5. An automatic record player as set forth in claim 4, further comprising a disc size select cam plate engaging with said disc size setting member, said disc size select cam plate being rotatably mounted to said stationary base plate, and rotated by means of a disc size select dial so as to control the position of said disc size setting member, sequentially.

* * * * *